United States Patent [19]

Cuda

[11] Patent Number: 4,923,272
[45] Date of Patent: May 8, 1990

[54] FIBER OPTIC CONNECTOR

[76] Inventor: Joseph Cuda, 2937 Christopher Creek Rd., N. Jacksonville, Fla. 32217

[21] Appl. No.: 252,088

[22] Filed: Oct. 3, 1988

[51] Int. Cl.⁵ .............................................. G02B 6/36
[52] U.S. Cl. ................................................ 350/96.20
[58] Field of Search .......................... 350/96.20, 96.21

[56] References Cited

U.S. PATENT DOCUMENTS

| | | | |
|---|---|---|---|
| 1,048,983 | 12/1912 | Madden | 362/75 |
| 1,073,850 | 9/1913 | Greer | 35/09 |
| 1,698,087 | 1/1929 | Field | 55/377 |
| 2,567,543 | 9/1951 | Brell | 85/8.5 |
| 3,314,696 | 4/1967 | Ferguson et al. | 285/174 |
| 3,753,582 | 8/1973 | Graham | 285/305 |
| 4,009,896 | 3/1977 | Brewer | 285/305 |
| 4,327,964 | 5/1982 | Haesly et al. | 350/96.20 |
| 4,354,731 | 10/1982 | Mouissie | 350/96.21 |
| 4,553,814 | 11/1985 | Bahl et al. | 350/96.21 |
| 4,804,243 | 2/1989 | Borsuk et al. | 350/96.20 |

*Primary Examiner*—Frank Gonzalez
*Assistant Examiner*—Phan T. Heartney
*Attorney, Agent, or Firm*—Banner, Birch, McKie & Beckett

[57] ABSTRACT

A fiber optic female connector including a female sleeve and a squared retaining spring connected thereto. The female sleeve defines a channel therethrough, parallel first and second side slots communicating with the channel, and a third slot perpendicular to the side slots and also opening into the channel. Bridge members at the channel define the ends of the third slot, and an encapsulating cover of the female sleeve defines the top portion thereof. First and second parallel legs of the spring are disposed, respectively, in the first and second side slots, and the transverse strand of the spring which connects the first and second legs is positioned in the third slot. When the rabbit ear ends of the spring are compressed, the first and second legs move from a position at least partially within the channel to a position further away from the centerline of the channel and the transverse strand by pressing against the bridge members flexes inwardly towards the channel. When the rabbit ears ends are released the first and second legs can engage into the sides of a circumferential groove of a male member inserted in the channel to lock the male member in the channel. Then by later compressing the ends of the rabbit ears the legs move out of the groove and the male member is unlocked and can be removed from the channel.

34 Claims, 2 Drawing Sheets

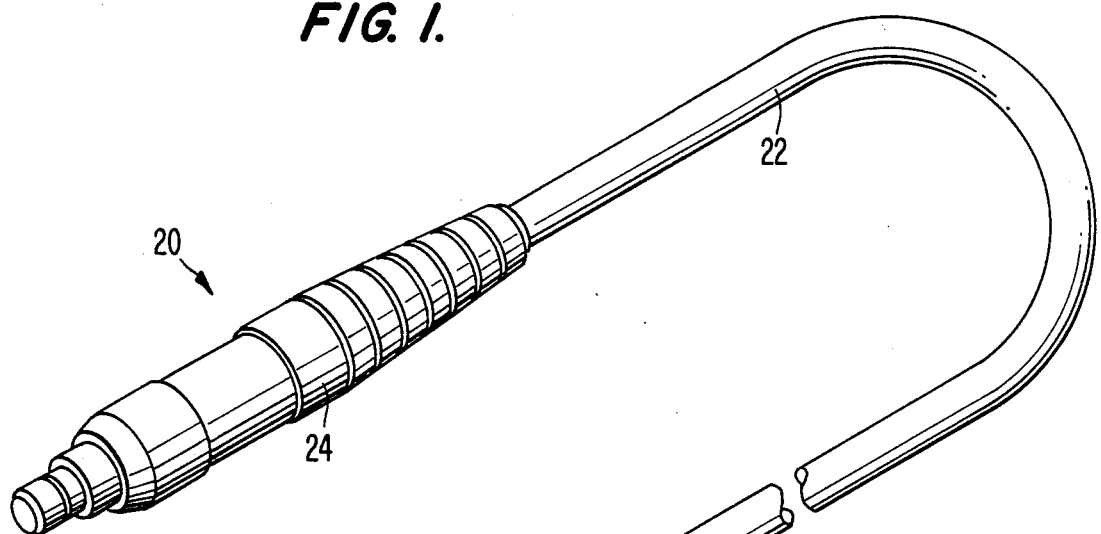
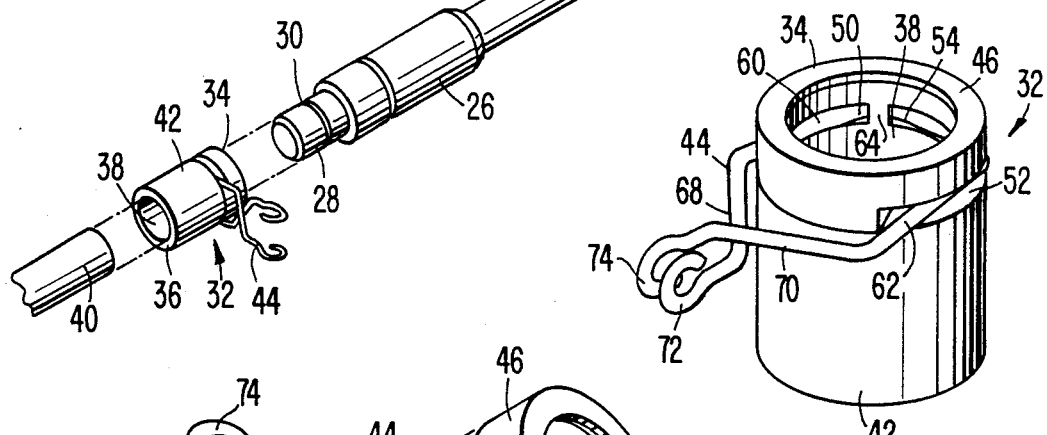
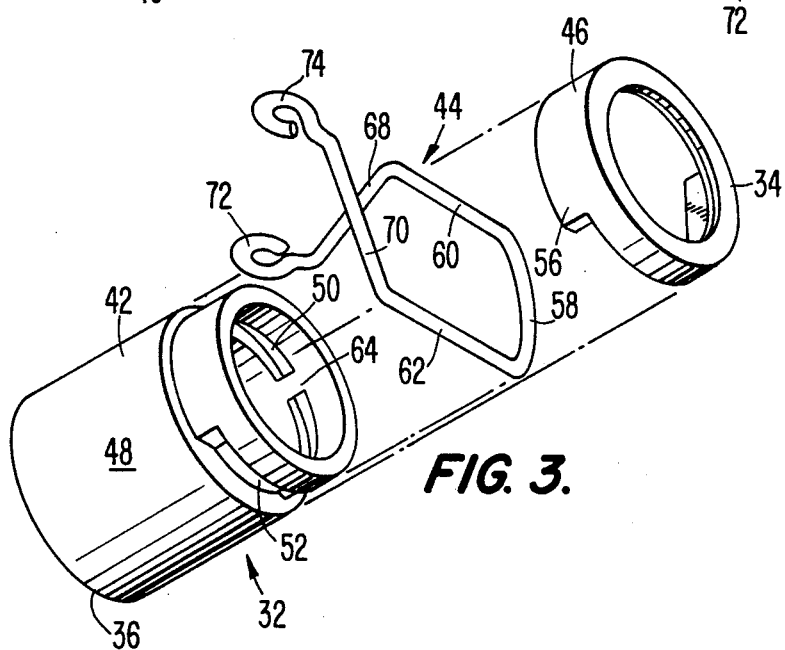
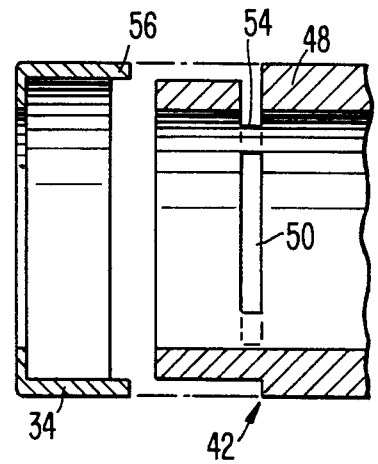

4,923,272

FIBER OPTIC CONNECTOR

BACKGROUND OF THE INVENTION

The present invention relates to connectors for fiber optic cables, and more particularly to female clip-on types of fiber optic connectors.

Different manufacturers use different types of connectors to connect light sources to the fiber optic cables to the surgical instruments and so forth. One of the most common types of connectors is a connector available from ACMI Corporation of Stamford, Conn., which is one of the oldest surgical instrument manufacturers. Their connectors consist of male and female portions. The male type is provided on both ends of the fiber optic cable, which can have fiber optic bundles having sizes ranging from a few microns all the way to about 6.5 mm in diameter. The female type of connection can be a permanent part of the fiber optic light source, fiber optic cable or surgical instrument or it can be a separate, independent connector, connecting the fiber optic cable to the surgical or other instrument. This instrument can have an ACMI male connection permanently attached to the instrument. In that situation a female connector is required which can accept on one side of the ACMI male connection and on the opposite side an ACMI male also. This connector is also sometimes made in such a way so that it accepts other types of instruments which require other types of connections there than ACMI. In that situation, one side of the female connector will still remain a ACMI female but on the opposite side can be a Richard Wolf Instrument Company, Storz Instrument Company, Pilling, Olympus or others.

There are two types of ACMI female connections presently available. One is usually described as a snap-on type with an internal spring which locks onto the ACMI male groove. The second type is a clip-on type with an external spring. It also locks onto the ACMI male groove and because of its distinctive spring shape is often referred to as a rabbit-ear connection. After use though the spring of this connector weakens and does not return to its originally intended locking position in the ACMI male groove. This results in the surgical instrument and the spring falling off sometimes at a critical stage in the surgical procedure. Additionally, the fiber optic cable can fall off and the delivery of high intensity light to the surgical site immediately interrupted. Thus, the surgery must be interrupted, and the fallen cable or instrument replaced with an autoclaved replacement.

The external spring type of ACMI female connector is preferred by some doctors because pulling is not required to disconnect the instrument from the cable. Rather, external spring ears are squeezed together thereby opening the spring to smoothly remove the instrument or fiber optic cable. On the other hand, the snap-on type of ACMI female connection requires approximately five pounds of push or pull to connect or disconnect it.

External springs or rabbit ears are either directly welded to the body of the connector or to the tubing. The supporting external spring is welded to the stainless steel connector body. When heat is applied to the external, tempered stainless steel spring, the spring is thereby permanently weakened. After a few uses it becomes over extended and does not return to its original shape, and thus will not lock effectively into the grooves of the ACMI male connector. Every additional use weakens the spring further resulting in the need for a permanent replacement of the fiber optic cable in situations when this connection is a permanent part of the fiber optic cable which is common.

Further, the external spring can be supported by a small piece of tubing which is welded to the body of the connector. This support configuration limits the function of the external spring and allows only the sides of the spring to function or flex thereby resulting in an over bending and a loss of spring memory.

SUMMARY OF THE INVENTION

Accordingly, it is a principle object of the present invention to provide an improved fiber optic connector design.

Another object of the present invention is to provide an improved clip-on type of female connector providing a reliable and consistent locking action.

A further object of the present invention is to provide an improved clip-on female connector whose design prevents the overbending and weakening of the spring component thereof.

A still further object of the present invention is to provide a novel fiber optic female connector configuration which is streamline and attractive.

Directed to achieving these objects, an improved fiber optic female connector is provided herein. This female connector is constructed of a female sleeve which encapsulates therein a squared retaining spring. The female sleeve is formed by an elongated sleeve member and a front cap press fit therewith. The elongated sleeve member and the front cap form opposite sides of parallel first and second side slots opening into a channel defined by the female sleeve. The sleeve member and front cap further define a third slot disposed generally perpendicularly to the first and second side slots, also opening into the channel and positioned within the circumferential surface of the sleeve. The squared retaining spring is formed by parallel first and second legs having opposite closed and open leg ends, a transverse strand directly connecting the close leg ends, and ear portions at the open leg ends. The first and second legs are aligned respectively in the first and second side slots and the transverse strand is parallel in the third slot. When the ear portions are pressed towards each other the first and second legs will move away from each other and further away from the center line of the channel, thereby further opening up the channel so that a male member can be inserted therein. When the ear portions are later released the first and second legs will then move towards the longitudinal center of the channel to engage in the sides of a circumferential groove of the male member, thereby locking the male member within the channel and to the female sleeve. The opposite ends of the third slot are defined by spaced bridge members of the channel. The squared retaining spring presses against these bridge members when the ear portions are compressed thereby flexing the middle of the transverse strand in the third slot and towards and into the channel.

Other objects and advantages of the present invention will become more apparent to those persons having ordinary skill in the art to which the present invention pertains from the following description taken in conjunction with the accompanying drawings.

BRIEF DESCRIPTION OF THE DRAWINGS

FIG. 1 is a perspective view of a fiber optic system using a female connector of the present invention wherein the components of the system are illustrated in an unconnected relation.

FIG. 2 is a perspective view of the female connector of FIG. 1 showing the retaining clip thereof in a compressed condition.

FIG. 3 is a perspective view of a first female connector of the present invention showing the components thereof in an exploded relation.

FIG. 4 is a longitudinal, exploded cross-sectional view of the female sleeve component of the female connector of FIG. 3.

DETAILED DESCRIPTION OF PREFERRED EMBODIMENTS OF THE PRESENT INVENTION

Figure 5:
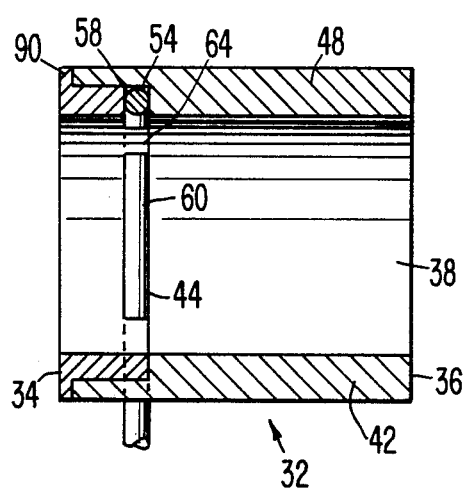
FIG. 5 is a longitudinal cross-sectional view of the female connector of FIG. 3.

Referring to FIG. 1, a fiber optic system of the present invention is illustrated generally at 20. Fiber optic system 20 is shown to comprise a fiber optic cable 22 having a male connector 24 at one end thereof and a male connector 26 at the other end thereof. The male connector 26 includes at its tip an elongated plug 28 having a circumferential groove 30 thereabout at a central location thereof. The system 20 further includes a female connector shown generally at 32 having a front end 34, a rear end 36 and a channel 38 extending therebetween. The channel 38 is adapted to receive therein through the front end 34 the plug 28 of the male connector 26. The channel 38 at the opposite end is adapted to receive therein the male portion 40 of an instrument or the like.

The female connector 32 is basically formed by a female sleeve shown generally at 42 and a squared retaining spring 44 held therein. The female sleeve 42 in turn is formed by a front cap 46 and an elongated sleeve member 48 press fit together, thereby defining a streamline cylinder, and surrounding and encompassing the retaining spring 44 as shown for example in FIG. 2. They also define opposite sides of parallel first and second side slots 50, 52 both opening into the channel 38 and a third slot 54 disposed generally perpendicular to the first and second side slots 50, 52 and also opening into the channel 38.

The female sleeve 48 further includes an encapsulating cover 56 which can be a part of either the elongated sleeve member 48 or the front cap 46 as will be explained later. The encapsulating cover 56 encapsulates the transverse strand 58 of the retaining spring 44 and forms the top portion of the third slot 54. This construction thereby positions the third slot 54 and thereby the transverse strand 58 entirely within the circumference of the female sleeve 42. The first and second parallel legs 60, 62 of the retaining spring 44 are disposed respectively within the first and second side slots 50, 52. First and second bridge members 64, 66 define the opposite ends of the third slot 54 and interact with the retaining spring 44, as will be explained later relative to FIG. 8.

The retaining spring 44 has a squared configuration formed by the generally perpendicular connection of the opposite ends of the transverse strand 58 to the first and second legs 60, 62. The first and second legs 60, 62 are generally straight through their extent through the first and second side slots 50, 52 and then curve and cross by portions 68, 70 and have loops 72, 74 at their outer ends. This curving and crossing arrangement is referred to as rabbit ears.

Figure 6:
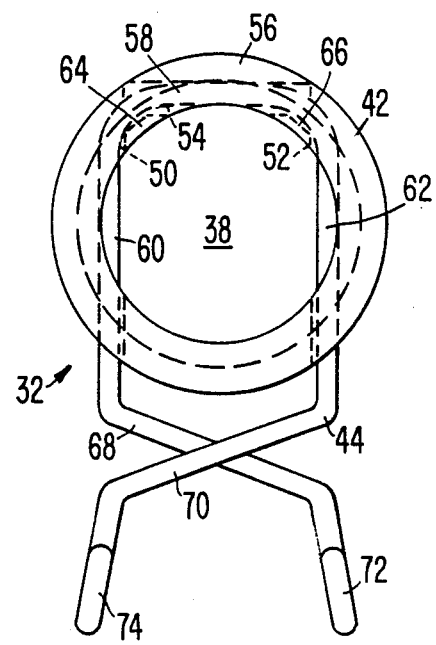
FIG. 6 is an end view of the female connector of FIG. 3.

These loops 72, 74 can be grasped between the thumb and forefinger of the user and pressed together to a compressed condition, as shown in FIG. 2, and subsequently released back into a normal or released position. When in the normal or released position the first and second legs 60, 62 have their middle portions extending through the first and second side slots 50, 52 into the channel 38, as depicted for example in FIG. 6. Then when the loop ends 72, 74 are compressed and the retaining spring 44 placed in its compressed condition the middle portions of the first and second legs 60, 62 are caused to move away from each other and from the center line of the channel 38. This thereby opens up the channel 38 and the elongated plug 28 can be inserted through the front end 34 into the channel 38 into an abutting position wherein the circumferential groove 30 lies in the plane of the first and second legs 60, 62. Then when the loop ends 72, 74 are released and the retaining spring 44 returns to its normal position the first and second legs 60, 62 extend further into the channel 38 and into the opposite sides of the circumferential groove 30. This then retains or locks the plug 28 of the male connector 26 into and to the female sleeve 42.

Figure 8:
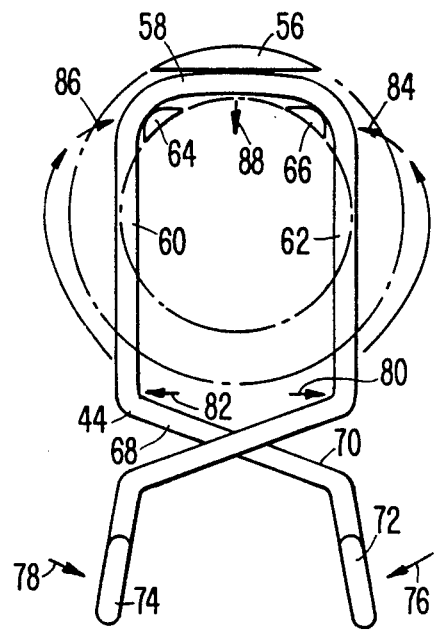
FIG. 8 is a schematic illustrating the forces and reactions to a retaining spring of a female connector of the present invention.

The flexing action of the various parts of the retaining spring 44 when the retaining spring is being pressed into its compressed condition are shown in FIG. 8. As the loop ends 72, 74 are pressed together as indicated by arrows 76, 78, the first and second legs 60, 62 are forced outwardly in the directions shown by arrows 80, 82. This creates a moment and forces, as shown by arrows 84, 86, the retaining spring 44 against the first and second bridge members 64, 66. When the retaining spring 44 is pressed against these spaced bridge members 64, 66 the middle of the transverse strand 58 is flexed downwardly, as depicted by arrow 88, into or at least towards the channel 38. Since the third slot 54 opens into the channel 38 the motion of the transverse strand 58 is not restrained by the female sleeve 42. Then when the loop ends 72, 74 are released and the retaining spring 44 returned to its normal position the transverse strand 58 will have its middle moved outwardly to its normal position which due to the configuration of the third slot 54 is spaced a distance inwardly from the encapsulating cover 56.

Figure 7:
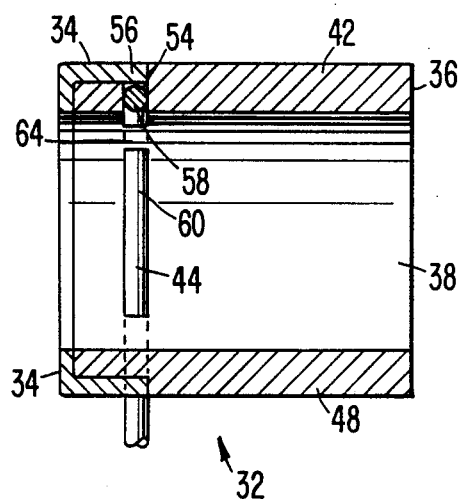
FIG. 7 is a longitudinal cross-sectional view similar to FIG. 3 of a second female connector of the present invention.

Two designs of the elongated sleeve member 48 and the front cap 46 are within the scope of this invention. A preferred design is for the front cap 46 to define a female part into which the elongated sleeve member 48, which in such case defines the male part, is press fit, and is best shown in FIGS. 3–5. In this embodiment the encapsulating cover 56 is formed by the front cap 46. An alternative or second embodiment is to reverse this relationship such that the three sides of the outline of the first and second side slots 50, 52 are defined by the front cap 46, as is best shown in FIG. 7, and wherein the front cap 46 is press fit into the elongated sleeve member 48. In this embodiment the encapsulating cover 56 is formed by the elongated sleeve member 48. The front cap 46 also has a radial ring or shoulder 90 at the front end 34.

In both of these embodiments not only is the retaining spring 44 securely encapsulated but the free movement of the ear portions thereof is not restrained. Further, the flexing action of the retaining spring 44 as discussed previously with regard to FIG. 8 prevents an overbending and a weakening of the spring 44 thereby extending the effective life and reliability of the spring. The spring 44 can thus flex along its entire perimeter for its locking and opening movements. A consistent locking action also thereby results which extends the life of the female connector 32 so as to be greater than the typical life of the fiber optic cable 22, which is approximately one year. This encapsulation of the spring 44 additionally brings the design level of the female connector 32 into streamline and modern standards, as is apparent from the drawings.

From the foregoing detailed description, it will be evident that there are a number of changes, adaptations and modifications of the present invention which come within the province of those skilled in the art. However, it is intended that all such variations not departing from the spirit of this invention be considered as within the scope thereof as limited solely by the claims appended hereto.

What is claimed is:

1. A female connector for a fiber optic cable including at one end thereof a male connector having a circumferential groove, said female connector comprising:
    a female sleeve having first and second ends, said female sleeve defining a channel therethrough between said first and second ends, parallel first and second side slots communicating along at least a portion of their lengths with said channel, and a third slot communicating along at least a portion of its length with said channel and disposed generally perpendicular to said first and second side slots; and
    a squared retaining spring including parallel first and second legs having opposite closed and open leg ends, a transverse strand directly connecting said closed leg ends, and ear portions at said open leg ends, said first and second legs being disposed respectively in said first and second side slots, and relative to said channel such that with a male connector of a fiber optic cable passing through said first end and disposed in said channel in an inserted connector position said first and second legs can extend into said channel and engage in a circumferential groove of the male connector and thereby releasably lock the male connector and said female sleeve together, said retaining spring being positionable in a compressed condition by moving said ear portions relative to each other, said first and second legs with said retaining spring in said compressed condition being moved away from the longitudinal center of said channel so that the male connector can be moved to and from the inserted connector position relative to said first end, and said third slot opening towards and into said channel so as to not restrict the inward flexure movement of at least the middle of said transverse strand relative to said channel as said retaining spring is moved to said compressed condition.

2. The female connector of claim 1 wherein said female sleeve includes an encapsulating cover positioned directly outward of said third slot.

3. The female connector of claim 2 wherein said female sleeve has a cylindrical outer surface defined in part by said encapsulating cover.

4. The female connector of claim 2 wherein said female sleeve includes a sleeve first part at said first end and a sleeve second part at said second end and fitted together with said sleeve first part.

5. The female connector of claim 4 wherein said encapsulating cover comprises a portion of said sleeve first part.

6. The female connector of claim 4 wherein said encapsulating cover comprises a portion of said sleeve second part.

7. The female connector of claim 2 wherein said encapsulating cover defines the outer surface of said third slot and is positioned a sufficient distance away from said channel so that said transverse strand does not touch it as said retaining spring is moved to and from said compressed condition thereof.

8. The female connector of claim 1 wherein said female sleeve includes a first bridge member at said channel and positioned between said first side slot and said third slot, and a second bridge member at said channel and positioned between said second side slot and said third slot.

9. The female connector of claim 8 wherein said first and second bridge members define the ends of said third slot.

10. The female connector of claim 9 wherein said retaining spring when in said compressed condition presses against said first and second bridge members.

11. The female connector of claim 1 wherein said ear portions have a crossed rabbit-ear configuration with loops at the ends thereof so that when said ends thereof are pressed towards each other said first and second legs are moved away from each other and the centerline of said channel.

12. The female connector of claim 1 wherein said transverse strand extends straight between and lies in the same plane as said first and second legs.

13. The female connector of claim 1 wherein said female sleeve has a cylindrical outer surface extending the entire length thereof, and said channel is cylindrical throughout its entire length.

14. The female connector of claim 1 wherein said first side slot, said second side slot and said third slot lie in the same plane which is perpendicular to the longitudinal axis of said channel.

15. The female connector of claim 1 wherein said female sleeve is formed by a first cylinder and a second cylinder press fit with said first cylinder.

16. The female connector of claim 15 wherein said first cylinder forms one side of said first and second slots and said second cylinder forms the opposite side of said first and second side slots.

17. The female connector of claim 15 wherein said first cylinder is at said first end and is press fit into said second cylinder.

18. The female connector of claim 15 wherein said first cylinder is at said first end, and said second cylinder is press fit into said first cylinder.

19. The female connector of claim 1 wherein said first and second side slots extend radially all of the way through said female sleeve to the outer surface thereof and thereby exposing at least a portion of said first and second legs.

20. The female connector of claim 1 wherein said second end of said female sleeve defines a free end for receiving therein and into said channel a male end of a fiber optic instrument to provide an operative connection via said female sleeve with the male connector of the fiber optic cable.

21. The female connector of claim 1 wherein said female sleeve is formed by a rear sleeve member and a front cap fixedly press fit into said rear sleeve member, encapsulating said retaining spring and allowing the free movement of said ear portions.

22. A fiber optic female connector comprising:
a female sleeve defining a sleeve channel therethrough, having an outer sleeve circumference surface, and being formed by an elongated sleeve member and a front cap press fit together, said elongated sleeve member and said front cap forming opposite sides of parallel first and second side slots opening into said channel and opposite surfaces of a passage disposed generally perpendicular to said first and second side slots and within said sleeve circumference surface; and
a squared retaining spring including parallel first and second legs having opposite closed and open leg ends, a transverse strand directly connecting said closed leg ends, and ear portions at said open leg ends, said first and second legs being disposed respectively in said first and second side slots, and relative to said channel such that said first and second legs can extend into said channel into a groove engaging and locking position, said retaining spring being positionable in a compressed condition by moving said ear portions relative to each other, said first and second legs with said retaining spring in said compressed condition being moved away from the longitudinal center of said channel to thereby more fully open up said channel, and said transverse strand being positioned in said passage.

23. The fiber optic female connector of claim 22 wherein said front cap defines a female part, said sleeve member defines a male part, and said male part is press fit into said female part.

24. The fiber optic female connector of claim 22 wherein said front cap defines a male member, said sleeve member defines a female part, and said male part is press fit into said female part.

25. The fiber optic female connector of claim 24 wherein said sleeve member has a front end ring, and said front cap has a radial shoulder abutting against said front end ring.

26. The fiber optic female connector of claim 22 wherein said female sleeve includes a first bridge member at said channel and positioned between said first side slot and said passage and a second bridge member at said channel and positioned between said second side slot and said passage, said first and second bridge members defining the ends of said passage.

27. The fiber optic female connector of claim 26 wherein said retaining spring when in said compressed condition presses against said first and second bridge members.

28. The fiber optic female connector of claim 22 wherein said ear positions have a crossed rabbit-ear configuration with loops at the ends thereof so that when said ends thereof are pressed towards each other said first and second legs are moved away from each other and the centerline of said channel.

29. The fiber optic female connector of claim 22 wherein said transverse strand extends straight between and lies in the same plane as said first and second legs, which plane is perpendicular to the longitudinal axis of said channel.

30. The fiber optic female connector of claim 22 wherein said female sleeve circumference surface is cylindrical throughout the entire length of said female sleeve, and said channel is cylindrical throughout its entire length.

31. The fiber optic female connector of claim 22 wherein said passage opens into said channel so that said transverse strand can flex towards said channel.

32. The fiber optic female connector of claim 22 wherein said elongated sleeve member has grooves formed on an outer surface thereof.

33. The fiber optic female connector of claim 22 wherein said front cap has grooves formed on an inner surface thereof.

34. The female connector of claim 1 wherein said transverse strand comprises a straight member straight between said closed leg ends.

* * * * *